Figure 1:
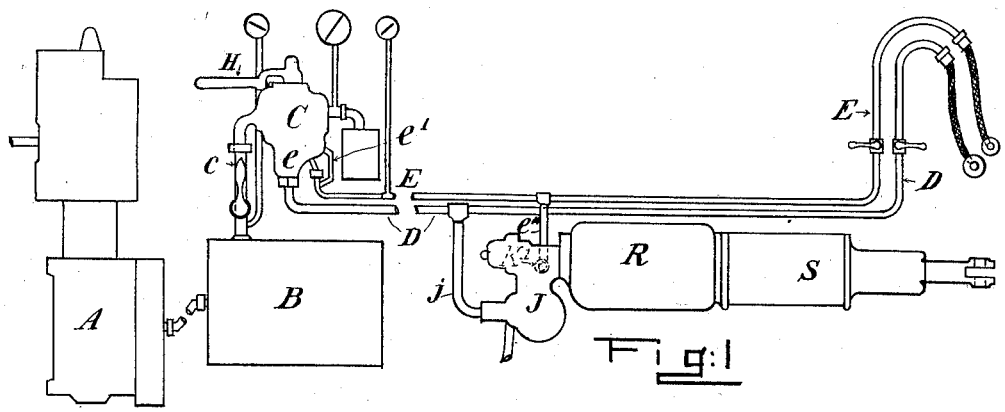
Figure 1A:
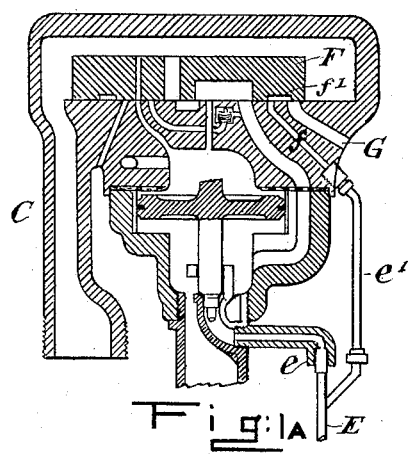

J. CHUDLEIGH & J. W. FELL.
AIR BRAKE VALVE.
APPLICATION FILED APR. 6, 1911.

1,043,803.

Patented Nov. 12, 1912.

2 SHEETS—SHEET 1.

Attest.
Centon M. Stahl
H. L. Alden

Inventors.
John Chudleigh.
John W. Fell.
By Wm. Wallace White.
Atty.

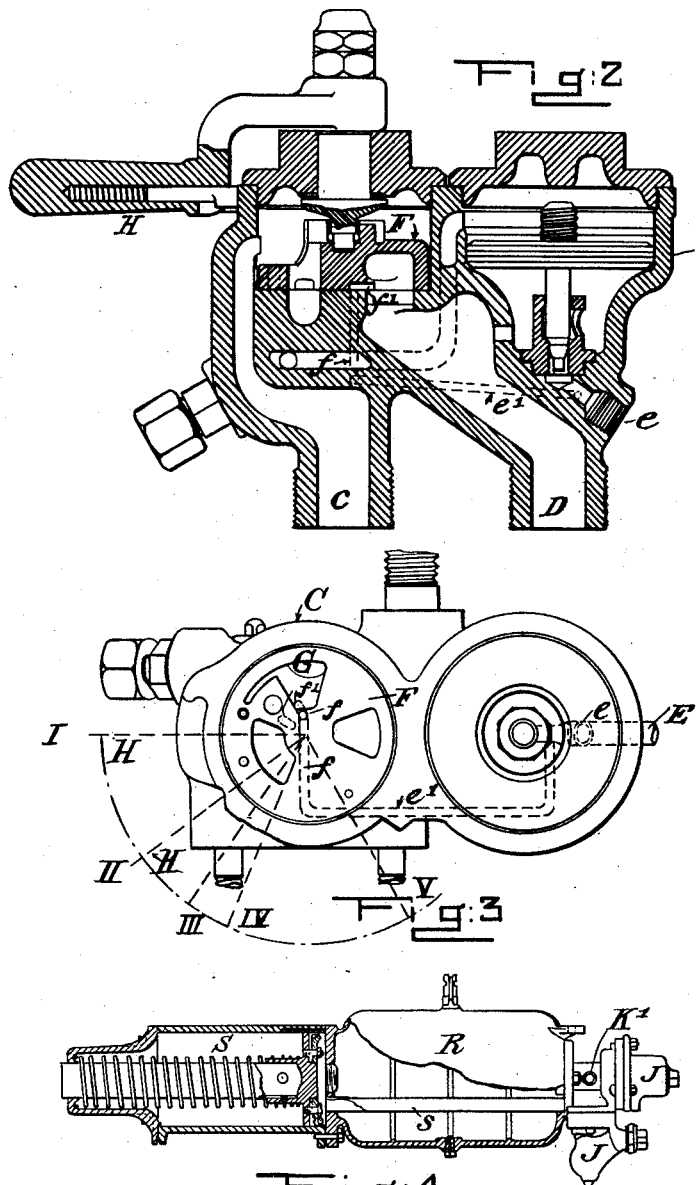

UNITED STATES PATENT OFFICE.

JOHN CHUDLEIGH, OF HABERFIELD, AND JOHN WILSON FELL, OF SYDNEY, NEW SOUTH WALES, AUSTRALIA.

AIR-BRAKE VALVE.

1,043,803.  Specification of Letters Patent.  Patented Nov. 12, 1912.

Application filed April 6, 1911. Serial No. 619,241.

*To all whom it may concern:*

Be it known that we, JOHN CHUDLEIGH and JOHN WILSON FELL, both subjects of the King of Great Britain and Ireland, residing at "Kapunda" Dickson street, Haberfield, and 119 George street, Sydney, both in the State of New South Wales, Commonwealth of Australia, respectively, have invented new and useful Air-Brake Valves, of which the following is a specification.

Hitherto, a difficulty with Westinghouse brake apparatus has been that the auxiliary reservoirs can only be charged with compressed air once in one complete cycle of operations, and cannot be re-charged until all the brakes have been released. This invention has been devised with a view to permit the re-charging of the auxiliary reservoirs with compressed air, without releasing the brakes.

A special air-lock and equilibrium valve have been designed to assist in attaining the object in view. This air-lock valve will be connected to each triple valve on a train. The connections will extend from the driver's brake-valve-train-pipe-exhaust through a continuous pipe which runs the whole length of the train, parallel to the train pipe. This continuous pipe will be provided with branch pipes opposite each triple valve, the exhaust passing from the driver's brake-valve into the continuous pipe, thence through the branch pipe into the air-lock equilibrium valve, where the pistons will close the exhaust to the atmosphere. The result will be that (through the regular movements of the parts in the triple valve) the exhaust from the brake cylinder will be closed by the special equilibrium valve, and, by a movement of the handle of the driver's brake-valve, a passage will be opened from the main reservoir to the auxiliary reservoirs, through the ordinary train pipe, so that the auxiliary reservoirs may be re-charged without releasing the brakes.

The air-lock valve comprises a compound piston of different diameters, and a stem valve in one piece, with the necessary air passages above and below the piston.

The operation of the air lock valve is entirely automatic.

The drawings have been mainly adopted from the Westinghouse brake reference-book, published by the Westinghouse Brake Company of Australasia, Limited, of Mutual Life Buildings, Martin Place, Sydney, Australia, date 1910. The general view Figure 1 is from a loose plate published by the British Company, 1894, plate No. 110ᴬ.

Although reference has been specifically made to the Westinghouse brake, the invention may be applied, with modifications, to other air-brake mechanism of the same type.

Figure 5:
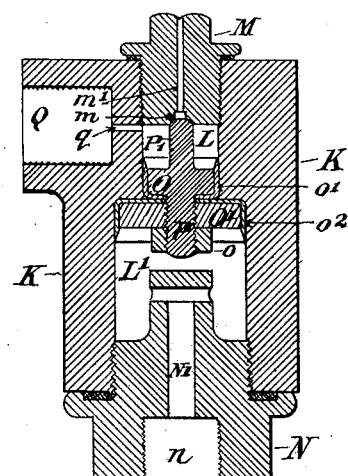
Figure 6:
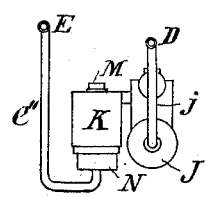

In the accompanying drawings:—Figure 1 is a diagrammatic view, not to scale, (copied from Plate 110ᴬ) of the general disposition of the various parts of the Westinghouse brake mechanism and the relation thereto of the new parts. Fig. 1ᴬ is a vertical section of an old type of driver's brake valve. This figure has been adopted with a view to show the application of the principle of the invention to an old type of brake-valve, and because the new passage, its connections, and the new port in the rotary valve can be more clearly illustrated from this type than from the new type of brake-valve shown in Figs. 2 and 3. Fig. 2 is a vertical section of the newest type of brake-valve, showing a new port in the face of the rotary valve, and, in dotted lines, a new passage in the valve casing leading to the train pipe exhaust opening. Fig. 3 is a horizontal section of the same taken on the line of the valve face, immediately below the rotary valve. Fig. 4 is a side view, partly in section, of a triple valve, an auxiliary reservoir, and a brake cylinder. There will be no alteration in these parts. Fig. 5 is a vertical section of the air-lock valve employed. Fig. 6 shows the connection between the continuous pipe, the air-lock valve, and the triple valve.

In Fig. 1, A is the air-pump, B the main reservoir, C the driver's brake-valve which is connected by the pipe $c$ to the main reservoir B; it is also connected to the main, or train, pipe D, that runs the whole length of the train, as is well understood. The driver's-brake valve-train-pipe-exhaust $e$ is connected to another continuous pipe E which runs the whole length of the train parallel to the train pipe.

A short distance from the train-pipe exhaust $e$, an air passage is bored in the valve casing C, such passage $e'$ uniting with a passage $f$ which terminates on the face upon which the rotary valve F rotates. In the underside of the rotary valve F is made a narrow port $f'$ adapted to overlie both the passage $f$ and the main exhaust port G of the brake valve body when the driver's brake handle H is in the position I, in Fig. 3. But in no other position of the brake handle H can this discharge take place, as, for instance, when the brake handle H is placed in position II, the rotary valve F will have been partly rotated and the port $f'$ will assume the position shown by dotted lines to the left of the passage $f$ and will therefore be closed. When the brake handle H is in the position I, the air in the continuous pipe E will be returned through the air-passage $e'$ and will be discharged into the atmosphere through the passage $f$, port $f'$, and the main exhaust port G. In the Fig. 1$^A$ the connection $e'$, between the brake valve exhaust $e$ and the new passage $f$ is shown outside the valve casing; but there is no alteration, it is merely an adjustment to different conditions.

It has been found impracticable to give a clear view of the rotary valve F on its seat in Fig. 3, the position of the port $f'$ in the rotary valve has therefore been represented by dotted lines on the face of the body of the valve.

In Fig. 3, five positions of the driver's brake handle are shown. I is the release position; II, the running position; III, the neutral position; IV is the brake application position, and, V is the emergency position, when the brake is to be quickly applied with full force.

Every triple valve J throughout the length of the train is connected by a branch pipe $j$ (Fig. 1), to the train-pipe D. Each triple valve J is also connected to the continuous pipe E by a branch pipe $e''$, but intermediately between the pipe E and the triple valve J the air-lock valve K is placed as shown in Fig. 6. In Fig. 1 and in Fig. 6 may be seen the position of the air-lock valve K, which is attached to the exhaust of the triple-valve J. In Fig. 4 the opposite side of the triple valve is turned toward the reader, the air-lock valve K being secured in the position shown by the double circles marked K', but the valve itself is not shown fixed in position.

The special air-lock valve K is constructed in four parts; (1) a casing K cylindrically and concentrically bored to two diameters L, L', tandem fashion; (2) a screw plug M which closes the external end of the small cylinder L. The screw plug M is axially bored with a small passage $m'$, the lower end of the passage forming a valve seat $m$. (3) The lower end of the cylinder L', of larger diameter is also closed by a screw plug N. The lower end of the screw plug N is recessed at $n$ to receive the end of the branch pipe $e''$ (Fig. 1) whereby the air-lock valve K is connected to the continuous pipe E; the plug is also bored at N' to form a T-shaped passage to admit the air from the continuous pipe E to the cylinder L. The plug N is screwed into the lower end of the casing K in the usual way. (4) The compound piston O—O', part O of which is adapted to fit the cylinder L and the part O' to fit the cylinder L'. The two parts of the piston are provided with bucket leathers or rings $o'$, $o^2$, so as to insure that no air shall pass from the cylinder L' into the cylinder L. Projecting from the upper side of the part O is a stem P', the upper end of which is formed as a cone valve, the coned part being adapted to enter the recess, or seat, $m$ in the plug M; and thus close the passage $m'$.

On the same level as the cylinder L, is a socket Q, to receive a nipple and pipe connecting the air-lock valve K with the exhaust from the triple valve. The socket Q is bored at $q$ so as to connect the cylinder L with the nipple. The passage $q$ will be below the level of the screw plug M. The compound piston O—O' is not provided with a piston-rod, it being considered that the whole will be maintained truly central by the cone valve on the stem P' seating itself at $m$.

The operation of the apparatus will be as follows:—The compressed air will pass from the main reservoir B through the pipe $c$ into the driver's brake-valve C, thence into the main train pipe D, thence, through $j$ into the triple valve J, thence into the auxiliary reservoir R, where the air will remain until the brakes are applied.

When a service application of the brake is to be made, the driver's brake handle H will be turned to a position suitable for the purpose, when air in the main train pipe D will be discharged into the continuous pipe E, through the driver's brake valve, and the exhaust $e$, thus reducing the pressure under the piston of the triple valve J. Air will then pass from the auxiliary reservoir R into the brake cylinder S, and the brakes will be applied. Simultaneously with the charging of the brake cylinder S with air from the auxiliary reservoir R, air will enter the bottom of the air-lock-valve K through the branch pipe $e''$ and nipple $n$, thus lifting the piston O—O', and, incidentally, through the cone valve closing the passage $m'$ in the screw plug M. This condition will be maintained in the air-lock valve K until the driver's brake handle H is moved into the position I, (Fig. 3), when the air will escape from the pipe E through the driver's brake valve C, and will be discharged through the exhaust G as previously explained in reference to Figs. 1$^A$, 2, and 3. For re-charging the auxiliary reservoirs, the driver's brake handle H will be moved, momentarily, to the position I, and then to the "running" position II, when air will flow from the main reservoir B, through the driver's brake valve C, into the train pipe D, and thence through the triple valve J to the auxiliary reservoirs R, thus moving the triple valve parts (not shown in the drawing) and, incidentally, opening a passage from the brake cylinder through the triple valve J to the air-lock valve K.

In order to release the brake, the driver's brake handle H will be brought into position I (Fig. 3), when the air in the pipe E will be discharged through the driver's brake-valve C, which it enters at the passage e, passes through the air-passage e', the passage f, and the port f' to the main exhaust G, thence into the atmosphere; and the air that had hitherto been confined in the brake-cylinder will be released, will pass through the pipe s (Fig. 4) back to the triple valve J, thence through the connection that enters the air-lock valve K at Q and q, with the result that the piston O—O' will be pushed down, the cone valve on the stem P' will be unseated, and the air will escape through the exhaust passage m' in the plug M to the atmosphere.

The new parts, with slight modifications, may also be applied to air-brake mechanism other than the Westinghouse, but it has been thought advisable to confine the description and operation of the new parts to one well-known type of apparatus.

Having now described our invention what we claim as new and desire to secure by Letters Patent is:—

1. In connection with Westinghouse air-brake mechanism, a continuous pipe connected to the driver's brake-valve-exhaust, a new passage, such as f made in the casing of the driver's brake-valve, a short branch pipe connecting the continuous pipe with the new passage and a new port on the under side of the rotary valve in the driver's brake valve, such port, in one position only, connecting the new passage with the exhaust port, whereby the air in the continuous pipe may be discharged, through the driver's brake-valve-exhaust port, into the atmosphere, as herein set forth.

2. In connection with Westinghouse brake mechanism, a new air-lock and equilibrium valve, comprising a valve casing having two internal diameters, tandem style, a compound piston adapted to fit the two diameters, means for connecting the smaller cylinder with the exhaust of the triple valve, whereby the air can pass from the triple valve exhaust through the smaller cylinder to the atmosphere, means for connecting the larger cylinder with the new continuous pipe, and means, preferably attached to the smaller part of the piston for closing the aperture to the outer atmosphere from the triple valve exhaust through the smaller cylinder, when the compound piston is in its highest position, as and for the purposes herein set forth.

In testimony whereof we have signed our names to this specification in the presence of two subscribing witnesses.

JOHN CHUDLEIGH.
JOHN WILSON FELL.

Witnesses:
ALBERT MASSEY,
H. C. CAMPBELL.